O. F. ORNDOFF.
FURROWING ATTACHMENT.
APPLICATION FILED JAN. 29, 1915.
1,169,183.
Patented Jan. 25, 1916.
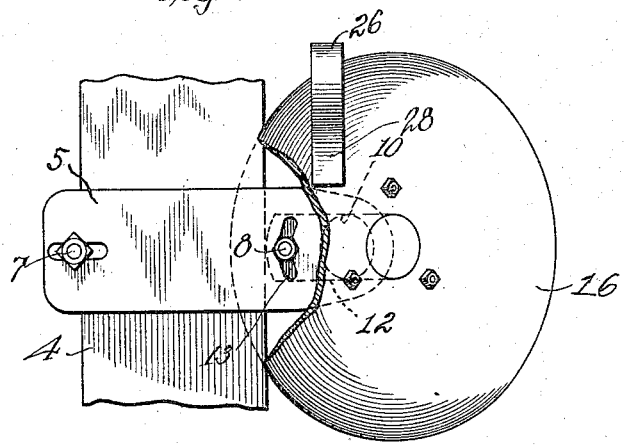
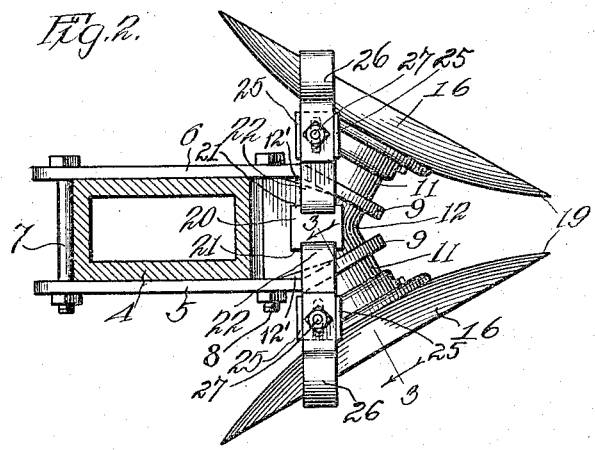
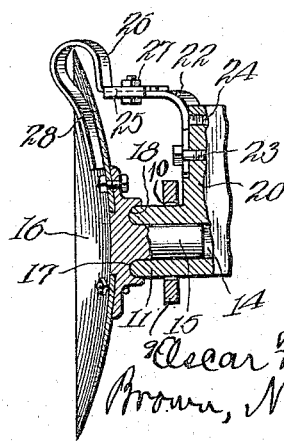
Inventor:
Oscar F. Orndoff
by Brown, Nissen & Pringle
Attys.

UNITED STATES PATENT OFFICE.

OSCAR F. ORNDOFF, OF COUNCIL BLUFFS, IOWA.

FURROWING ATTACHMENT.

1,169,183.  Specification of Letters Patent.  Patented Jan. 25, 1916.

Application filed January 29, 1915.  Serial No. 5,015.

*To all whom it may concern:*

Be it known that I, OSCAR F. ORNDOFF, a citizen of the United States, residing at Council Bluffs, in the county of Pottawattamie and State of Iowa, have invented certain new and useful Improvements in Furrowing Attachments, of which the following is a specification.

My invention relates to furrowing attachments and has for its object the provision of a simple and efficient furrow-opener for corn planters and the like, which is adapted to be easily and quickly attached to and detached from the planter.

A further object is to provide a device of this character adapted for adjustment to vary the size and depth of the furrow produced.

Other objects will appear hereinafter.

The improvement consists in substantially the combinations and arrangement of parts hereinafter described, set forth in the accompanying drawing forming a part of this specification and more particularly specified in the subjoined claims.

In the drawing—Figure 1 is a side elevation of a furrowing attachment embodying my invention, with portions broken away to show underlying parts. Fig. 2 is a plan view of my furrowing attachment secured to a portion of a planter, and Fig. 3 is a section taken on the line 3—3 of Fig. 2.

My invention is adaptable to all forms of planting machines and is particularly adaptable for corn planters. I have shown it as attached to the seed tube of a corn planter, but from the description following it will be obvious to one skilled in the art that it is equally adaptable for planters of other sorts.

The device consists of a clamping means adapted to be easily and quickly attached to the seed tube 4 or other portion of a planter, when so desired. The clamping means in the present instance consists of two plates 5 and 6 disposed on opposite sides of the seed tube and clamped against the latter by means of bolts 7 and 8. The bolts 7 and 8 and plates 5 and 6 may be varied to fit tubes of different shapes and sizes, or other portions of the planter to which the device is to be attached. The forward ends 9 of the plates 5 and 6 are preferably set at an angle to the main portions of the plates and provided with perforations 10 through which bearing extensions 11 formed on a central block 12, are extended. The perforations 10 coöperating with the extensions 11 are slightly larger than the latter and form somewhat loose pivotal joints between the block 12 and plates 5 and 6 so that adjustment of the block may be had about the extensions 11. The block is cut away as at 12' to prevent it from locking against the angular portions 9 of the plates 5 and 6 in its angular movement about extensions 11. The plates 5 and 6 are provided with arcual slots 13, one of which is shown in the drawing, through which the bolt 8 passes. From this construction it is clear that upon swinging the block 12 in a vertical plane, the bolt 8 will be moved through the slots 13, and upon tightening the nut of bolt 8 the block may be set at different positions of this pivotal movement.

Each of the extensions 11 is provided with an opening 14 in which is journaled the spindle 15 of one of the disks 16. The hub of the disk 16 is preferably provided with a recess 17 formed in a manner to fit the outer end of the extension 11 as at 18, in order to prevent dirt from entering the opening 14 around the spindle 15. The extensions 11 are set at an angle to each other so that the disks will be close together at their front edges, as indicated at 19 in Fig. 2. This provides means whereby the front edges will cut the dirt and upon passing through the ground, throw the dirt outwardly. By moving the block 12 on its pivotal point, the disk will be shifted so that the front edges, where they contact the ground, will be farther apart, or narrower, according to the adjustment. In order to make the furrow shallower or deeper, the plates 5 and 6 are set higher or lower on the seed tube 4, as desired.

On the upper side of block 12, is a vertical extension 20 having beads 21 along the edges of two of its parallel sides. Between the beads 21 on each side, is mounted an angular member 22, and secured to the extension 20 by means of a bolt 23. The extension 20 is provided with one or more extra perforations 24, so that disks of various sizes may be accommodated. The vertically disposed portions of the angular parts 22 are provided with beads 25 between which is mounted a curved scraper member 26. The scraper member is secured to its angular member by means of a bolt 27. The scraper portion 28 of the scraper member 26, is adapted to engage the outer surface of the disk 16 at an angle, so that only one edge of the scraper engages the surface of the disk. The two scraper members 26, as will be noted from the drawing, bear on the outer sides of the disks holding the hubs of the latter against the ends of the extensions 11 and are disposed substantially at right angles to the plates 5 and 6. The angular disposition of the disks renders the scraping surface 28 at the proper angles to the disks, in order to effect maximum cleaning of the latter.

While I have illustrated and described the preferred form of construction, I do not desire to be limited to the precise details set forth, but desire to avail myself of such variations and changes as come within the scope of the appended claims.

What I claim is:

1. A furrowing attachment comprising a block having bearing extensions extending laterally at opposite sides thereof; a disk journaled in each of said extensions; supporting plates disposed on opposite sides of said block and having perforations engaging said extensions and arcual slots concentric with the perforations; and a bolt passing through said block and said arcual slots adjustably securing the block between the plates.

2. A furrowing attachment comprising a block having two laterally diverging bearing extensions thereon adjacent one of its edges; a disk journaled in each of said extensions; plates disposed on opposite sides of said block and each plate having an end portion perforated and disposed over one of the extensions, and an arcual slot substantially concentric with said perforation; a bolt passing through said block and the arcual slots of the plates adjustably securing the latter to said block; a support extending between said plates, the latter being provided with longitudinal slots at the edge of the support opposite said block; and a bolt passing through said longitudinal slots clamping the plates to the support.

3. A furrowing attachment comprising a supporting plate; a block adjustably secured to said plate and having a bearing extension disposed laterally at an angle thereto; a disk journaled in said bearing extension; a vertical extension on said block having its lateral sides substantially parallel with the plate; and a scraper secured to said vertical support and extending over and engaging the disk angularly.

4. A furrowing attachment comprising a block having a bearing extension disposed laterally at an angle to the block; a disk journaled in said bearing extension; a supporting plate secured to said block; a vertical extension on said block having its lateral sides substantially parallel with the plate; and a scraper secured to said vertical support and extending over and engaging the disk angularly.

In testimony whereof I have signed my name to this specification, in the presence of two subscribing witnesses, on this 25th day of January A. D. 1915.

OSCAR F. ORNDOFF.

Witnesses:
THOMAS COLSON,
CHARLES H. SEEM.

Copies of this patent may be obtained for five cents each, by addressing the "Commissioner of Patents, Washington, D. C."